(12) United States Patent
Aldridge et al.

(10) Patent No.: US 6,935,108 B2
(45) Date of Patent: Aug. 30, 2005

(54) HEAT FAN ASSEMBLY AND METHOD OF CONTROLLING A FAN

(75) Inventors: Wayne Kenneth Aldridge, Granby (GB); David Anthony Clark, Huntington (GB); Heather Allderidge, Derby (GB)

(73) Assignee: Microgen Energy Limited (GB)

( * ) Notice: Subject to any disclaimer, the term of this patent is extended or adjusted under 35 U.S.C. 154(b) by 0 days.

(21) Appl. No.: 10/492,806

(22) PCT Filed: Oct. 11, 2002

(86) PCT No.: PCT/GB02/04607
§ 371 (c)(1),
(2), (4) Date: Apr. 14, 2004

(87) PCT Pub. No.: WO03/033961
PCT Pub. Date: Apr. 24, 2003

(65) Prior Publication Data
US 2004/0237520 A1 Dec. 2, 2004

(30) Foreign Application Priority Data
Oct. 17, 2001 (GB) .............................. 0124985

(51) Int. Cl.[7] .............................................. F01B 29/10
(52) U.S. Cl. .......................................... 60/524; 60/517
(58) Field of Search ........................ 60/517, 520, 524, 60/526

(56) References Cited

U.S. PATENT DOCUMENTS

| 5,040,972 | A | * | 8/1991 | Kleinhenz et al. ............ 432/72 |
| 5,228,293 | A | * | 7/1993 | Vitale ....................... 60/641.14 |
| 5,305,735 | A | * | 4/1994 | Welden .................... 126/355.1 |
| 5,393,222 | A | | 2/1995 | Sutton .......................... 431/80 |
| 5,813,241 | A | * | 9/1998 | Sibik et al. .................... 62/148 |
| 5,829,248 | A | * | 11/1998 | Clifton ........................ 60/286 |
| 6,113,384 | A | | 9/2000 | Sebastiani .................... 431/12 |
| 6,788,884 | B2 | * | 9/2004 | Reichelt ..................... 392/307 |

FOREIGN PATENT DOCUMENTS

| DE | 100 00 406 | 7/2000 |
| DE | 199 36 591 | 2/2001 |
| EP | 1 030 123 | 2/2000 |
| EP | 1 083 393 | 8/2000 |

OTHER PUBLICATIONS

Patent Abstracts of Japan. Soichi, Matsushita Electric Ind. Co. Ltd. Pub. Date Jan. 31, 1992, Pub. No. 04028919.

* cited by examiner

Primary Examiner—Hoang Nguyen
(74) Attorney, Agent, or Firm—Needle & Rosenberg, P.C.

(57) ABSTRACT

A fan assembly comprising two fans (4, 10) for supplying combustible gases to two burners (5, 9) respectively. The flow parts from the first and second burners are combined in a common manifold. Temperature censor (6, 11) detect the temperature of the gases passing through each fan, and the speed of a particular fan is increased if the temperature sensor detects reverse flow of combustion gases.

18 Claims, 2 Drawing Sheets

HEAT FAN ASSEMBLY AND METHOD OF CONTROLLING A FAN

This application claims priority to Great Britain Application no. 0124985.3 filed on Oct. 17, 2001 which is incorporated herein by reference.

The present invention relates to a fan assembly and a method of controlling a fan.

The invention has a particular application in a domestic combined heat and power system incorporating a Stirling engine.

In such a system, a Stirling engine is heated by a first burner and is connected to an alternator to generate electricity. The heat produced by the engine which would otherwise be wasted is used to heat water feeding the domestic hot water and central heating systems, and therefore becomes a valuable product of the DCHP system. It has been shown that the most favourable economics are achieved for the unit when the Stirling engine/alternator is sized to generate approximately 1 kW of electricity. At this level, however, approximately 5 kW of heat will be produced, which is substantially below a typical domestic heat load which may be in excess of 20 kW. In order to supply the remaining heat, necessary so that the DCHP unit can compete effectively with the current specification of domestic boiler, a supplementary gas burner and heat exchanger are included in the appliance. In order to satisfy a varying domestic heat and electricity load, the two burners modulate and either can be switched off at any time. The exhaust from the burners is combined in a common manifold. It is therefore possible for combustion products from an active burner to flow back into a dormant burner. Such hot gases will at best cause thermal shock to cooler components causing wear, damage and potential catastrophic failure. At worst, such reverse flows could cause explosive conditions to occur.

To avoid this problem, the fans to the two burners could be kept operating at all times. However, the power required to do this will reduce the overall efficiency of the unit. Alternatively, the flows through the fans could be monitored and any changes in the direction of gas flows can be detected as soon as they occur. The conventional way of doing this is to measure the change in pressure between two points along the flow path. However, the equipment needed to do this is relatively costly and takes up valuable space in an already cramped environment.

According to a first aspect of the invention a fan assembly for supplying combustion gases to a burner comprises a fan, a controller for selectively running the fan to supply the gases, in use, to the burner, and a temperature sensor positioned to monitor the temperature of the gases passing through the fan and being coupled to the controller, a further heat source with a flow path to the fan whereby the controller is arranged to increase the speed of the fan in response to the temperature sensor detecting that the further heat source has caused a parameter relating to the temperature of the gases passing through the fan to be above a threshold value.

By using a temperature sensor, rather than a differential pressure detector, the sensor arrangement can be made much cheaper and more compact.

One option is to use the temperature of the gases as the parameter. A quick rate of increase of the temperature of gasses passing through the fan is characteristic of combustion gases flowing back through a fan. It is therefore more reliable to use the rate of increase of the temperature of the gases as the parameter.

If a fan is running slowly, and a back flow is detected, the controller will increase the speed of the fan. However, in the normal course of events, the increase in speed will take the form of starting the fan from rest.

Under some circumstances, due to the unavoidable heating by conduction through the casing of adjacent components by an active burner, the intake of a non-operating burner may be at an elevated temperature. As this heating effect is gradual, it will not cause any shock heating effects and should not cause high enough temperatures to give any danger of mixture pre-ignition. The only consequence may be a marginally higher temperature in the intake to the burner than in the burner itself. Under normal operation, a reverse flow is detectable by the intake temperature rising to exceed that in the burner, but this may clearly not be the case if this gradual heating effect occurs. Thus, there is no need to increase the speed of the fan under these circumstances. If, however, the gradual heating effect becomes excessive, the fan should be activated to cool the inactive burner. Thus, preferably, the controller is arranged to increase the speed of the fan in response to the temperature sensor detecting a temperature above a threshold value regardless of the rate of increase of the temperature. With this arrangement, the fan will not be activated in response to the gradual heating effects, unless these become excessive.

According to a second aspect of the invention a method of controlling a fan to supply combustion gases to a burner comprises detecting the temperature of gases passing through the fan, and increasing the speed of the fan if heat from a further heat source has been transmitted to the fan, such that a detected parameter relating to the temperature of the gases passing through the fan exceeds a threshold value.

The invention can be applied to any situation where a fan is supplying combustion gases to a burner. However, it has particularly designed to be used with the domestic heat and power arrangement as mentioned above.

Thus, according to a third aspect of the present invention a Stirling engine assembly comprises a Stirling engine heated by a first burner, a first fan for supplying combustible gases to the first burner, a supplementary heater heated by a second burner, a second fan for supplying combustible gases to a second burner, wherein flow paths from the first and second burners are combined in a common manifold, a temperature sensor for detecting the temperature of the gases passing through each fan, and a controller to increase the speed of a fan if its temperature sensor detects that a parameter relating to the temperature of the gases is above a threshold value.

The common manifold is preferably a heat exchanger forming the supplementary heater.

An example of a fan assembly and Stirling engine assembly in accordance with the present invention will now be described with reference to the accompanying drawings, in which.

Figure 1:
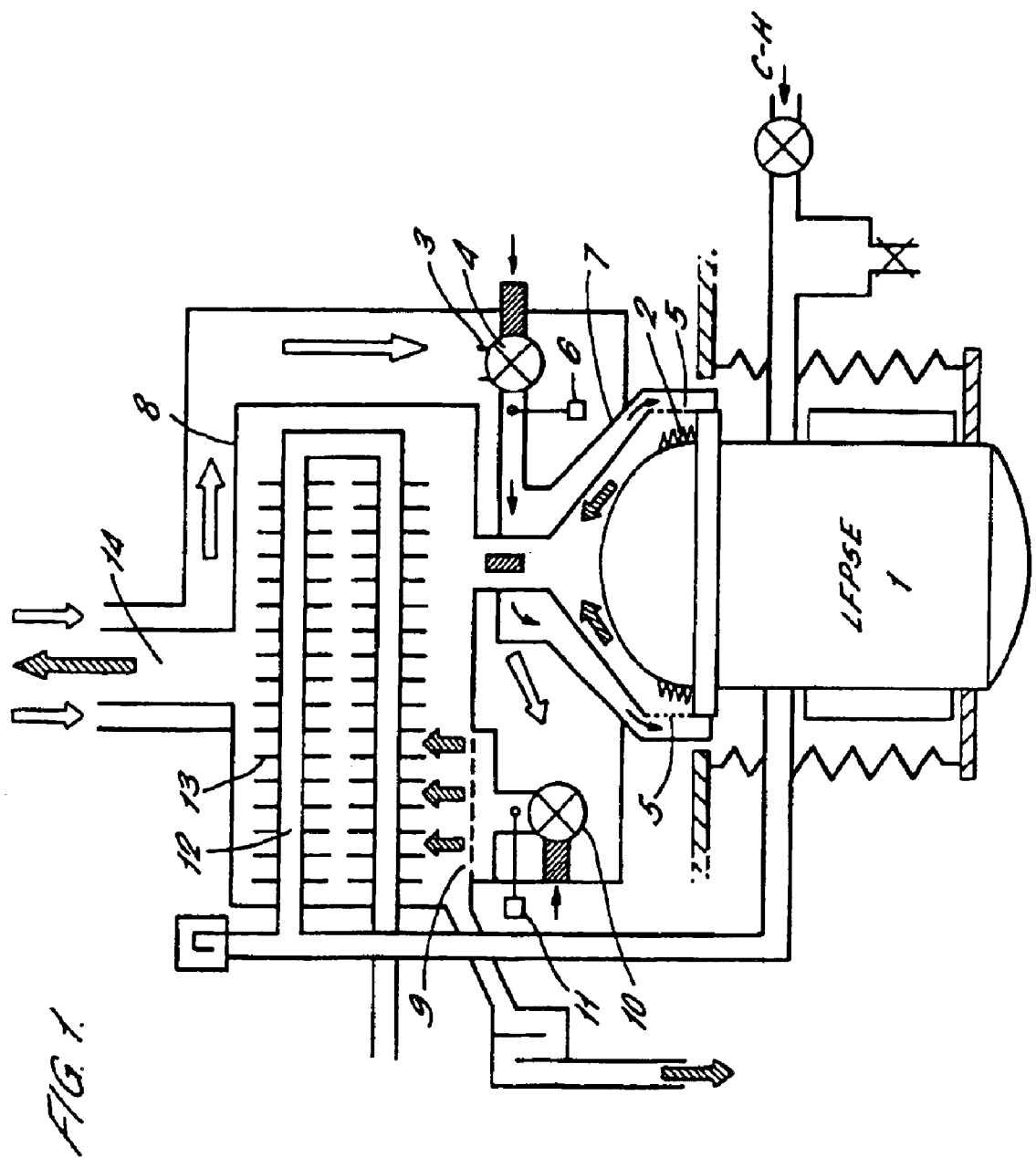
FIG. 1 is a schematic cross-section of the Stirling engine assembly.

The apparatus comprises a Stirling engine 1, the head of which is provided with a series of fins as disclosed in our earlier co-pending application GB 0020012.1. Combustible gas is provided along a duct 3 and is driven by first fan 4 through a first burner 5. A first temperature detector 6 is provided immediately downstream of the fan 4 to detect a temperature of gas at this point. An exhaust manifold 7 leads from the head of the engine to a water heater 8.

The water heater 8 is primarily heated by a second burner 9 of conventional construction. This burner 9 is provided with combustible gases by a second fan 10. A second temperature detector 11 similar to first temperature detector 6 is provided immediately downstream of the second fan 10. A coiled pipe 12 with fins 13 extends through the heat exchanger 8 to carry a flow of water. This water primarily receives heat from the second burner 9, but also receives heat from the exhaust gas from the flue 7. The two gas flows are combined in the heat exchanger 8 and are exhausted through common exhaust manifolds 14.

Depending on the heat load of the dwelling, one or other of the fans 4, 10 may be idle. If the second fan 10 is idle, exhaust gas from the first burner 5 entering the heat exchanger 8 can flow back through the second fan 10. Alternatively, if the first fan 4 is idle, exhaust gas from the second burner 9, can flow back through the first fan 4.

The exhaust gases will be considerably hotter than the incoming gases which are normally blown by each fan to its respective burner. Thus, any back flow of exhaust gases will be detectable as a temperature increase at either the first 6 or second 11 temperature sensor.

Figure 2:
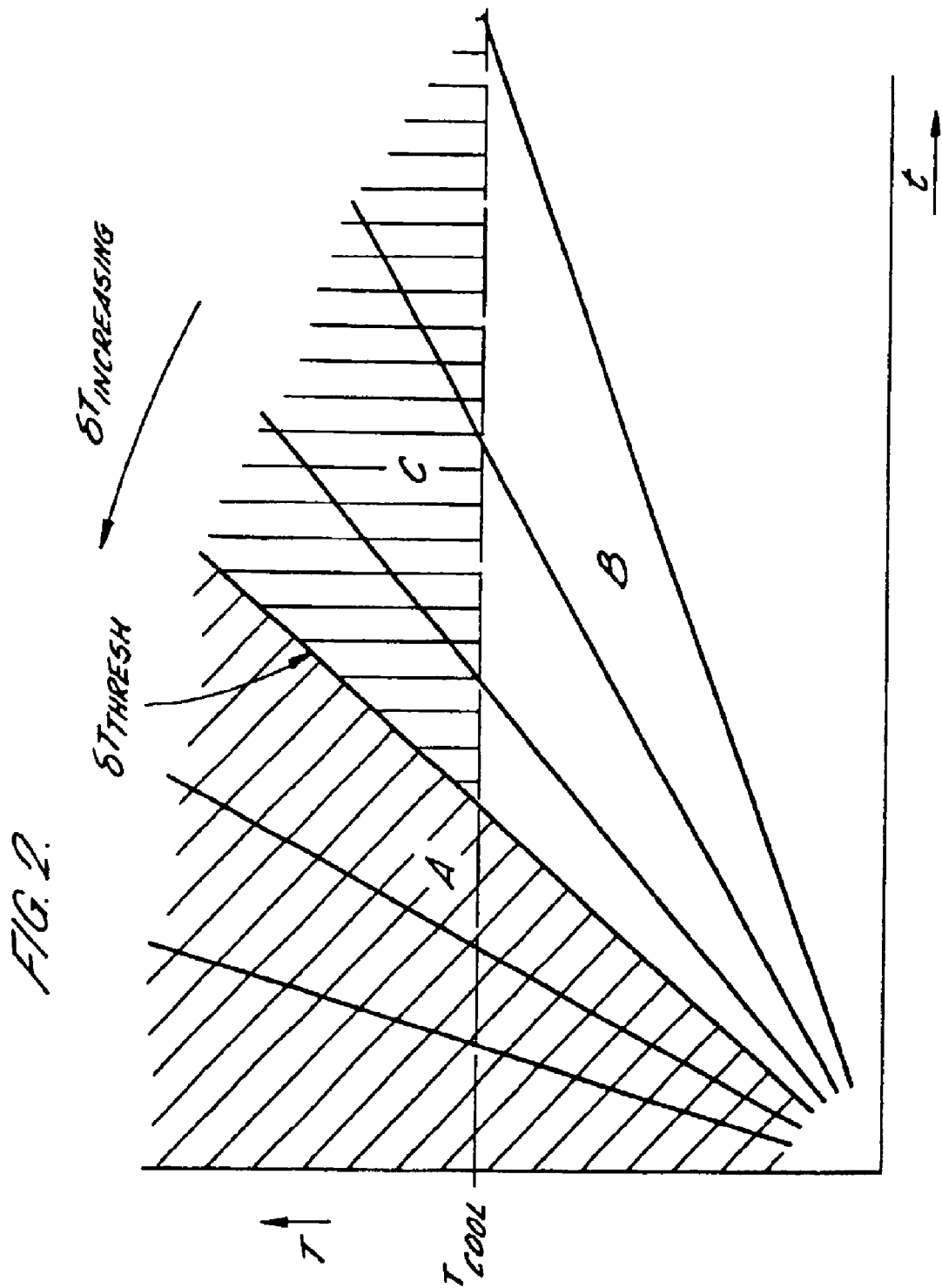
FIG. 2 is a graph of temperature against time illustrating the principle underlying the present invention.

FIG. 2 is a graph of temperature against time as detected by either temperature sensor 6, 11 of a dormant fan. The graph indicates how a controller (not shown) calculates when to switch on the dormant fan. Whenever the temperature sensor detects that the rate of increase of temperature is above a threshold value ($\delta T_{thresh}$) the fan will be activated irrespective of the absolute temperature. This region is indicated on the graph as region A. If the rate of increase of temperature is below $\delta T_{thresh}$, and the temperature is below a threshold temperature $T_{cool}$, the fan will not be activated. This is illustrated by region B in the graph. However, once the temperature rises above $T_{cool}$, the fan will be activated irrespective of the rate of increase of temperature. This is illustrated by region C on the graph.

If backflow occurs from a burner through a fan the temperature rapidly increases (region A) and the fan will be activated. If a fan is being heated by conduction through the casing of a dormant burner, then a slow rate of heating will be indicated (region B) and the fan will not be turned on unless the temperature becomes excessive (region C).

What is claimed is:

1. A fan assembly for supplying combustion gases to a burner, the assembly comprising a fan, a controller for selectively running the fan to supply the gases, in use, to the burner, and a temperature sensor positioned to monitor the temperature of the gases passing through the fan and being coupled to the controller, a further heat source with a flow path to the fan whereby the controller is arranged to increase the speed of the fan in response to the temperature sensor detecting that the further heat source has caused a parameter relating to the temperature of the gases passing through the fan to be above a threshold value.

2. A fan assembly according to claim 1, wherein the parameter is rate of increase of temperature.

3. A fan assembly according to claim 1, wherein the parameter is temperature.

4. A fan assembly according to claim 1, wherein the controller is arranged to start the fan from rest.

5. A fan assembly according to claim 2, wherein the controller is arranged to increase the speed of the fan in response to the temperature sensor detecting a temperature above a threshold value regardless of the rate of increase of the temperature.

6. A fan assembly according to claim 1, wherein the further heat source is a second fan and burner assembly.

7. A method of controlling a fan to supply combustion gases to a burner, the method comprising detecting the temperature of gases passing through the fan, and increasing the speed of the fan if heat from a further heat source has been transmitted to the fan, such that a detected parameter relating to the temperature of the gases passing through the fan exceeds a threshold value.

8. A method according to claim 7, wherein the parameter is rate of increase of temperature.

9. A method according to claim 7, wherein the parameter is temperature.

10. A method according to claim 7, wherein a step of increasing the speed of the fan comprises starting the fan from rest.

11. A method according to claim 8, further comprising the step of increasing the speed of the fan if the temperature is above a threshold value regardless of the rate of increase of the temperature.

12. A method according to claim 7, wherein the further heat source is a second fan and burner assembly.

13. A Stirling engine assembly comprising a Stirling engine heated by a first burner, a first fan for supplying combustible gases to the first burner, a supplementary heater heated by a second burner, a second fan for supplying combustible gases to the second burner, wherein flow paths from the first and second burners are combined in a common manifold, a temperature sensor for detecting the temperature of the gases passing through each fan, and a controller to increase the speed of a fan if its temperature sensor detects that a parameter relating to the temperature of the gases is above a threshold value.

14. An assembly according to claim 13, wherein the parameter is increase of temperature.

15. An assembly according to claim 13, wherein the parameter is temperature.

16. An assembly according to claim 13, wherein the controller is arranged to start the fan from rest.

17. An assembly according to claim 13, wherein the common manifold is a heat exchanger.

18. An assembly according to claim 14, wherein the controller is arranged to increase the speed of the fan in response to the temperature sensor detecting a temperature above a higher threshold vale regardless of the rate of increase of the temperature.

* * * * *